TONE ARM HEAD

Filed May 26, 1948

R. R. Majors

INVENTOR

BY C. A. Snow & Co.

ATTORNEYS.

Patented Jan. 16, 1951 2,538,694

UNITED STATES PATENT OFFICE 2,538,694

TONE ARM HEAD

Robert R. Majors, Muskogee, Okla.

Application May 26, 1948, Serial No. 29,349

1 Claim. (Cl. 274—23)

This invention relates to a tone arm head for a coin operated record playing machine.

A pronounced disadvantage noted in connection with some record playing machines of the coin operated type now in use is the fact that the tone arm heads thereon are formed for a magnetic pick-up only. A head carrying a magnetic pick-up is unusually heavy, exerting a pressure upon the record being played of approximately three and one-half ounces. As a result, wear on the record is heavy, this involving considerable expense on the part of the machine operator due to the necessity of frequent replacement of records required by such wear.

Previously, it has been necessary that the machine operator bear this expense, without recourse to any means for eliminating the expense, as long as the record playing machine is still serviceable.

There are crystal cartridge pick-ups now in general use that would, if applied to a coin operated record player such as described above, eliminate this heavy outlay of money. The crystal pick-up applies a pressure to a record of approximately an ounce to an ounce and one-half. This eliminates record wear, and allows one record to be played approximately four times as long as is the case with a magnetic pick-up now in general use on said machines.

It is the primary object of the present invention to provide a means whereby a tone arm head adapted to carry a crystal cartridge pick-up can be substituted for magnetic tone arm heads already in use on old machines, thus to permit continued use of said machines without the heavy expenses now required.

It is a further important object to provide a tone arm head as described that can be applied to the tone arm now on said machine, with ease, and in a manner which will provide an attractive appearance for the tone arm and head giving little indication of the substitution having been made.

It is a further important object to provide a tone arm head of the crystal cartridge type that can be substituted for the magnetic tone arm head already in use on said machines, that will be connectable to the tone arm securely and in a manner eliminating the possibility of vibration of the head relative to the arm or vice versa.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figures 1, 2, 3, 4:
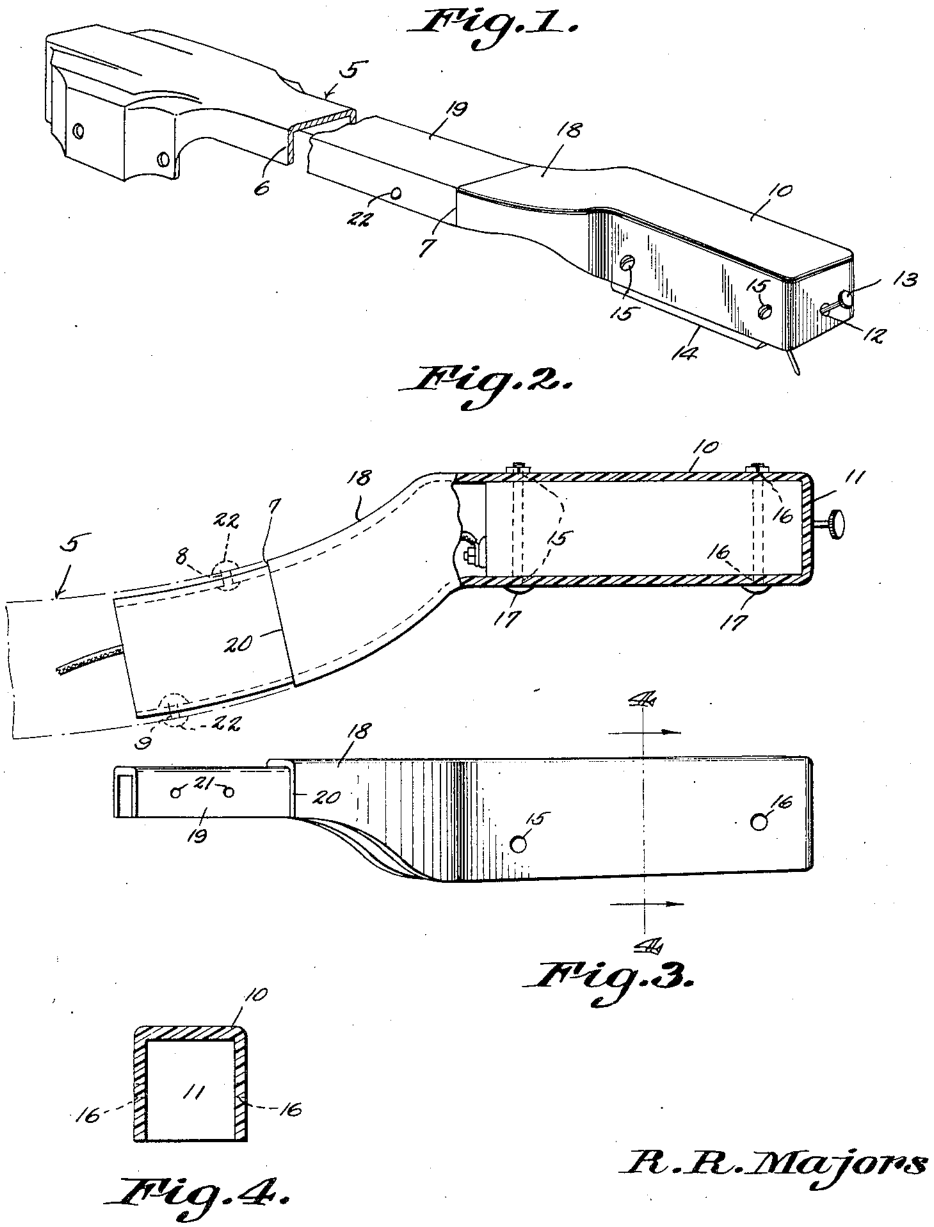
Figure 1 is a perspective view of a tone arm head constructed in accordance with the invention, connected to the tone arm of a record playing machine, portions of the tone arm being broken away.
Fig. 2 is a view of the tone arm head partly in side elevation and partly in longitudinal section, a portion of the tone arm being shown in dotted lines.
Fig. 3 is a perspective view of the tone arm head as viewed from the rear.
Fig. 4 is a section on line 4—4 of Fig. 3.

Referring to the drawings in detail, 5 designates generally a tone arm of conventional construction used on a conventional record playing machine of the coin operated type. The medial portion of the tone arm is formed as a channel member 6, said medial portion curving longitudinally, as may be particularly noted from Fig. 2.

A tone arm of this type is already in use, and constitutes no part of the present invention. However, in accordance with the invention, I remove the tone arm head, not shown, of the tone arm 5, by cutting through the longitudinally curved channel member 6 transversely and along a straight line, as shown at 7. The member 6 is so cut preferably immediately rearward of the magnetic tone arm head constructed integral therewith.

In one side wall of the channel member 6 I form an opening 8, which in the present instance is near the point 7 at which the arm is cut. In the other side wall, I form an opening 9, which is spaced a greater distance from said cut end edge. There can be more than two openings such as illustrated, but if two only are used, it is preferable that they not be transversely aligned, because this could conceivably result in time in the tone arm head constructed in accordance with the invention and to be described hereinafter becoming slightly loose relative to the tone arm 5.

The tone arm head which is the subject of the present invention is formed of any suitable material, such as plastic or metal. Preferably thin material is used, so as to contribute to lightness. It includes a rectangular end portion 10, having a closed end wall 11 at one end in which is formed an opening 12 for receiving the needle retaining screw 13 of a crystal cartridge 14. The cartridge 14 and screw 13 are not part of the present invention, these being already known and in use. Transversely aligned pairs of openings 15 and 16 are formed in the side walls of the end portion 10, receiving fastening means 17 that extend through the block of the cartridge 14, thus to hold the cartridge securely within said end portion.

The end portion 10 is open at its inner end, for passage of the leads extending from the cartridge 14, and merges into a goose-neck 18.

From the inner end of the neck 18, and formed integrally therewith and with the end portion 10, extends a connector member 19 of channel formation, and curved longitudinally in correspondence to the longitudinally curved medial portion 6. By reference to Figs. 2 and 3, it will be observed that the member 19 is reduced both in width and height relative to the neck 18, so that there is thus defined a U-shaped shoulder 20 at the meeting point of the member 19 and neck 18. Openings 21 are formed in the side walls of the connector member 19, these registering with openings 8 and 9 of the tone arm 5, so that rivets 22 or other suitable fastening means may be used to secure the tone arm head to the tone arm.

It will be observed that the connector member 19 is so proportioned relative to the channel member 6 of the tone arm as to result in the outer surfaces of the side walls and upper wall of the member 19 engaging snugly the inner surfaces of the side walls and upper wall of the channel member 6. The connector member 19 extends for its whole length into the channel member 6, so that the end edge 7 of the channel member 6 is brought tightly up against the shoulder 20. Utilizing this arrangement, the tone arm head of the invention appears as a normal extension of the tone arm 5 already in use on the record playing machine. Additionally, the engagement between the shoulder 20 and end edge 7, and between the respective side walls and upper walls of the channel member 6 of the tone arm and the connector member 19 of the tone arm head, cooperates with the fastening means 22 in effecting a rigid connection which will prevent relative vibration between the tone arm head and the tone arm.

What is claimed is:

The combination, with a tone arm having a channeled longitudinally curved medial portion, of a tone arm head adapted for connection to said medial portion, said head including a rectangular cartridge receiving portion at one end, a gooseneck extending from said rectangular portion, and a channeled connector member extending from the gooseneck and reduced transversely relative to the gooseneck to define a shoulder at the meeting point between said member and gooseneck, said connector member being longitudinally curved corresponding to the curvature of said medial portion of the tone arm and being proportioned to be received throughout its length in the channeled medial portion of the tone arm with said shoulder abutting against the end of the medial portion, said medial portion and connector member having openings in their side walls adapted to register when the shoulder is in abutting engagement with the medial portion, the registering openings on one side of the connected tone arm medial portion and connector member being out of alignment with the registering openings on the other side, and fastening means extending through said registering openings and constituting a rigid connection between the tone arm and tone arm head.

ROBERT R. MAJORS.

REFERENCES CITED

The following references are of record in the file of this patent:

UNITED STATES PATENTS

| Number | Name | Date |
|---|---|---|
| 1,440,180 | Schiff | Dec. 26, 1922 |
| 2,271,039 | Slade et al. | Jan. 27, 1942 |
| 2,346,733 | Dally | Apr. 18, 1944 |